(12) United States Patent
Cobb

(10) Patent No.: US 10,699,598 B2
(45) Date of Patent: Jun. 30, 2020

(54) CPR PATIENT TRAINING MANNEQUIN

(71) Applicant: Suzan Cobb, Ninilchik, AK (US)

(72) Inventor: Suzan Cobb, Ninilchik, AK (US)

( * ) Notice: Subject to any disclaimer, the term of this patent is extended or adjusted under 35 U.S.C. 154(b) by 0 days.

(21) Appl. No.: 16/417,851

(22) Filed: May 21, 2019

(65) Prior Publication Data

US 2019/0279531 A1    Sep. 12, 2019

Related U.S. Application Data

(63) Continuation-in-part of application No. 15/203,438, filed on Jul. 6, 2016, now Pat. No. 10,339,834.

(60) Provisional application No. 62/188,914, filed on Jul. 6, 2015.

(51) Int. Cl.
  *G09B 23/28* (2006.01)
  *A61H 31/00* (2006.01)
  *G09B 23/32* (2006.01)

(52) U.S. Cl.
  CPC ......... *G09B 23/288* (2013.01); *A61H 31/005* (2013.01); *G09B 23/32* (2013.01); *A61H 2201/5028* (2013.01)

(58) Field of Classification Search
  CPC .... G09B 23/28; G09B 23/283; G09B 23/285; G09B 23/286; G09B 23/288; G09B 23/30; G09B 23/303; G09B 23/306; G09B 23/32; G09B 23/34; A61H 31/005; A61H 2201/5028
  See application file for complete search history.

(56) References Cited

U.S. PATENT DOCUMENTS

| | | | |
|---|---|---|---|
| 2008/0227073 A1* | 9/2008 | Bardsley | G09B 23/30 434/267 |
| 2010/0021876 A1* | 1/2010 | Clash | G09B 23/288 434/265 |
| 2010/0312153 A1* | 12/2010 | McIntyre | A61B 5/053 601/41 |

* cited by examiner

*Primary Examiner* — Timothy A Musselman
(74) *Attorney, Agent, or Firm* — Argus Intellectual Enterprise; Daniel Enea; Jordan Sworen

(57) ABSTRACT

A CPR patient training mannequin. The CPR patient training mannequin provides for training and teaching individuals in proper CPR technique. The mannequin includes a simulated torso section and simulated head section that enables a user to administer CPR and visually inspect the mannequin response to the administration. The torso section utilizes a sensor configured to detect pressure exerted by a user performing chest compressions and includes one or more lights positioned in a simulated carotid artery and brain that are operably connected to the sensor. The lights are configured to illuminate to indicate the pressure exerted by a user. In an alternative embodiment, the torso section includes simulated lungs having lights that illuminate if a user properly performs a jaw-thrust maneuver and nose pinch on the mannequin.

17 Claims, 6 Drawing Sheets

CPR PATIENT TRAINING MANNEQUIN

CROSS REFERENCE TO RELATED APPLICATION

This application is a continuation-in-part of U.S. application Ser. No. 15/203,438, filed Jul. 6, 2016, now pending, which claims the benefit of U.S. provisional application No. 62/188,914 filed on Jul. 6, 2015, the above identified patent application is herein incorporated by reference in its entirety.

BACKGROUND OF THE INVENTION

The present invention relates to a CPR patient training mannequin (or manikin) for training and teaching individual's proper CPR technique. More specifically, the present invention relates to a patient training mannequin on which individuals perform CPR, wherein the training mannequin indicates proper technique and force application through the illumination of one or more lights disposed throughout a torso section and head section.

Training mannequins, which are models of the human body, have proven a useful element in healthcare training, especially for teaching and practicing CPR techniques. CPR, also known a cardiopulmonary resuscitation, is an emergency procedure that usually consists of a combination of chest compressions and artificial ventilation. CPR instruction involves both theory and practical technique. There is a public interest in providing basic CPR training to many people since it is usually applied in an emergency situation where it may not be practical to wait until a CPR expert arrives at the scene. It is believed that simple techniques can be effective and that the more people that know the techniques the more likely that there will be someone available to assist an emergency victim.

Over the years, there have been attempts to provide CPR training mannequins for the purposes of training individuals. However, these attempts have several shortcomings. One of the shortcomings includes mannequins failing to provide adequate feedback to the individual regarding proper CPR technique. The internal pressure of the arteries needs to be sufficiently high to provide the brain of the patient with oxygenated blood from the heart. An additional shortcoming is that these devices fail to provide a way of viewing the complex and interrelated functions and structures of the human body that are pertinent to the proper administration of CPR to a patient. Thus, there exists a need for an apparatus that students can benefit from by practicing CPR techniques thereon.

In light of the devices disclosed in the known art, it is submitted that the present invention substantially diverges in design elements from the known art and consequently it is clear that there is a need in the art for an improvement to a CPR training mannequin. In this regard the instant invention substantially fulfills these needs.

SUMMARY OF THE INVENTION

In view of the foregoing disadvantages inherent in the known types of training mannequins now present in the known art, the present invention provides a CPR training mannequin that utilizes a sensor configured to detect pressure exerted by a user performing chest compressions thereon, one or more lights operably connected to the sensor and configured to indicate the pressure by illuminating the one or more lights in a certain manner.

It is therefore an object of the present invention to provide a new and improved CPR training mannequin that has all of the advantages of the devices in the known art and none of the disadvantages.

The present invention relates to a CPR training mannequin comprising a housing having a head section and a torso section, both of which has a general appearance of a human head and torso. The torso section includes a skeletal support structure encompassing a simulated heart therein. A sensor disposed about the mannequin is configured to detect pressure being applied to the simulated heart and torso section. The sensor is operably connected to a simulated carotid artery having a plurality of lights at intervals, the plurality of lights being configured to illuminate in response to the sensor detecting a first pressure, a second pressure, and the like.

It is another object of the present invention to provide a way of viewing the complex and interrelated functions and structures of the human body that are pertinent to the proper administration of CPR to a patient. In particular, the present invention provides a housing having a transparent section configured to allow a user to visually inspect the skeletal support structure, the heart, the carotid artery, and the brain.

It is therefore an object of the present invention to provide a CPR training mannequin comprising simulated lungs disposed within the torso section and a simulated mouth and nose disposed on the head section, wherein the lungs illuminate if a user properly performs a jaw-thrust maneuver and nose pinch.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
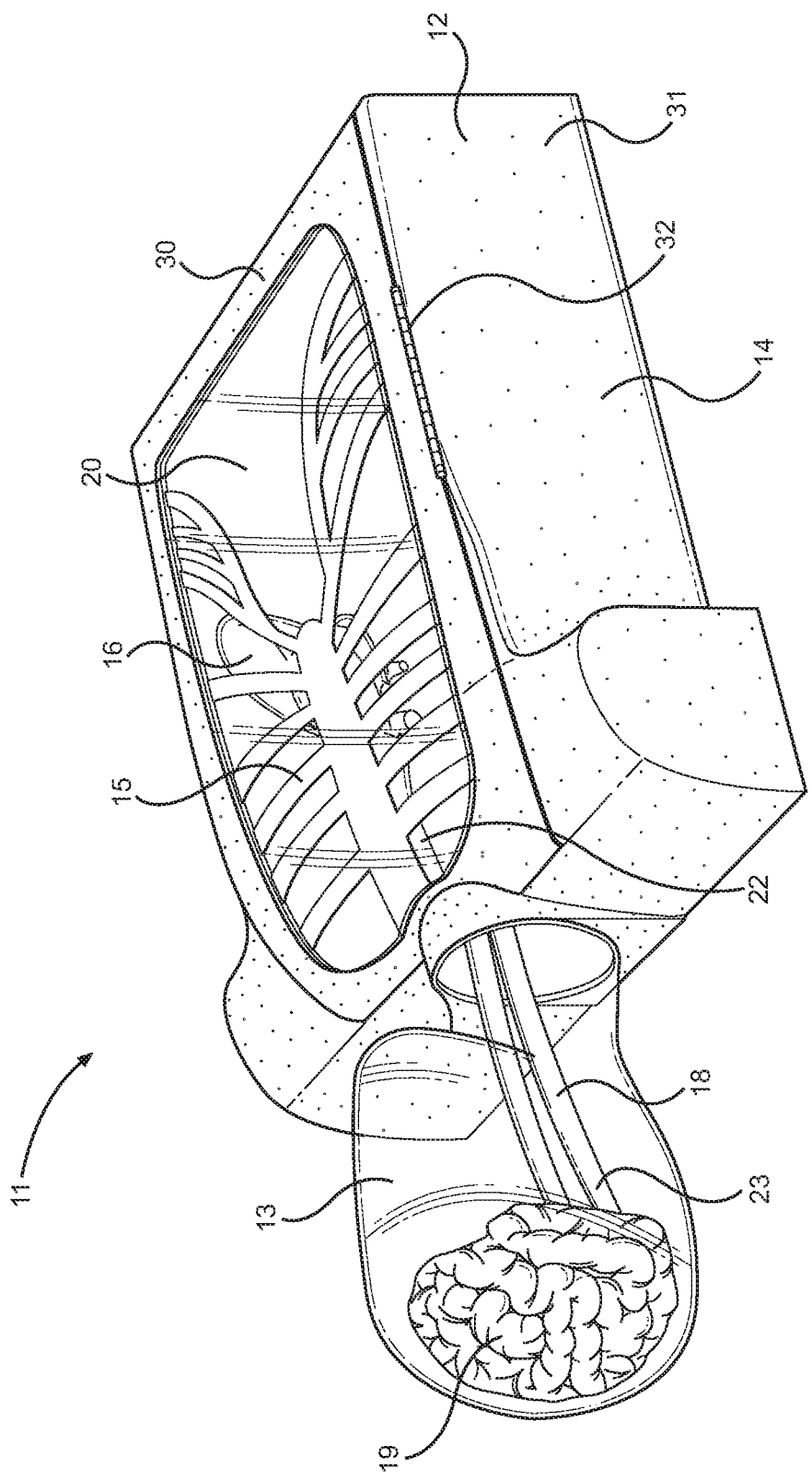
FIG. 1 shows a perspective view of one embodiment of the present invention.

Reference is made herein to the attached drawings. Like reference numerals are used throughout the drawings to depict like or similar elements of the patient training mannequin. For the purposes of presenting a brief and clear description of the present invention, the preferred embodiment will be discussed as used for providing CPR training mannequin for practicing cardiopulmonary resuscitation of a human. The figures are intended for representative purposes only and should not be considered to be limiting in any respect.

Referring now to FIG. 1, there is shown a perspective view of one embodiment of the present invention. The patient training mannequin 11 provides an apparatus for training a user to administer cardiopulmonary resuscitation (CPR) and visually inspect the bodily response to the administration thereof. The patient training mannequin 11 comprises a housing 12 having a head section 13 connected to a torso section 14. Both the head section 13 and torso section 14 have a general appearance of a human head and torso. The torso section 14 includes a skeletal support structure 15 encompassed by the housing 12 and a simulated heart 16 disposed within the skeletal support structure 15. The skeletal support structure 15 has a general appearance of a rib cage or thoracic cage. A sensor (not shown) is in electronic communication with a simulated carotid artery 18. The carotid artery 18 is connected to the heart 16 at a first end 22, and to the brain 19 at an opposing second end 23. In the shown embodiment, the carotid artery 18 comprises a pair of parallel and elongated tubes.

In the shown embodiment, the housing 12 comprises an upper shell 30 pivotally connected to a lower shell 31 via a hinge 32. The upper shell 30 is configured to rotate toward and away from the lower shell 31. In this way, the heart 16, skeletal support structure 15, the sensor 17, and the carotid artery 18 may be accessible and removed by a user.

Further, the housing 12 comprises a transparent section 20 configured to allow a user to visually inspect the skeletal support structure 15, the heart 16, the carotid artery 18, and the brain 19. In this way, a user can learn the location of these anatomical parts and how they are arranged within a body. Further, the transparent section 20 provides real time feedback regarding proper and improper CPR technique.

Figure 2:
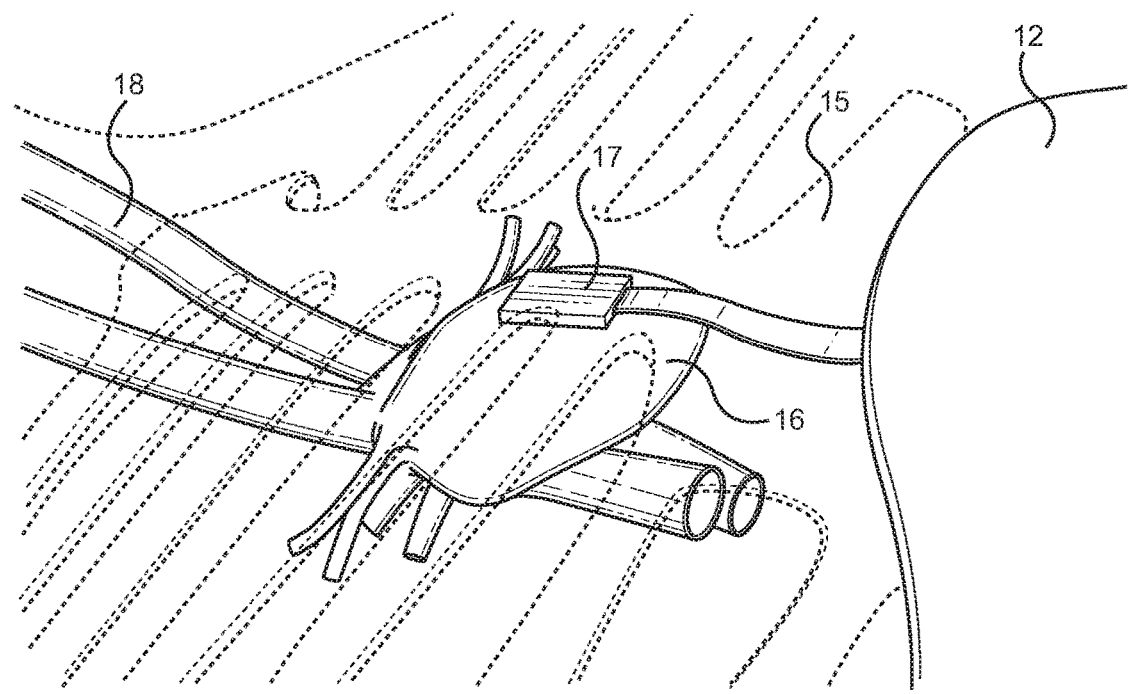
FIG. 2 shows a close-up view of one embodiment of the torso section of the present invention.
Figure 3:
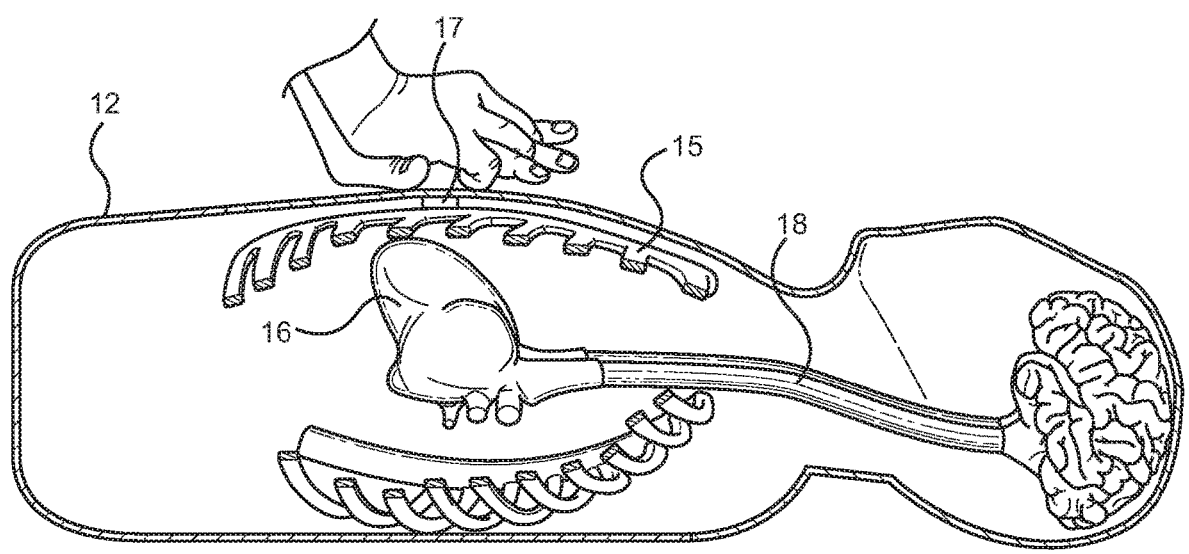
FIG. 3 shows a cross-sectional view of one embodiment of the present invention.

Referring now to FIGS. 2 and 3, there is shown a close-up view of one embodiment of the torso section of the present invention and a cross-sectional view of one embodiment of the present invention, respectfully. In the shown embodiment, the skeletal support structure 15 comprises a ribcage that provides structural support to the torso section 12. The heart 16 is positioned within the skeletal structure 15, approximately equidistant from the anterior and posterior sides of the skeletal support structure 15. The sensor 17 includes a plate configured to detect pressure applied thereto. The sensor 17 is positioned between the exterior of the heart 16 and the housing 12. However, the position of the sensor 17 is not limited to this embodiment. For example, the sensor 17 may be integral with the heart 16. In yet other embodiments, the sensor 17 may be positioned on the exterior of the torso section 12. The sensor 17 is configured to detect pressure applied to the torso section 12. In particular, the sensor 17 can detect pressure applied from a user performing CPR chest compressions. The sensor 17 may be electrically powered by a battery or other power source.

In addition, the torso section 12 is configured to compress or, deflect inward, when force is applied by a user thereto. In a preferred embodiment, the skeletal support structure 15 deflects inward at a distance of approximately 2 inches, simulating the generally accepted proper amount of deflection required for chest compressions.

Figure 4:
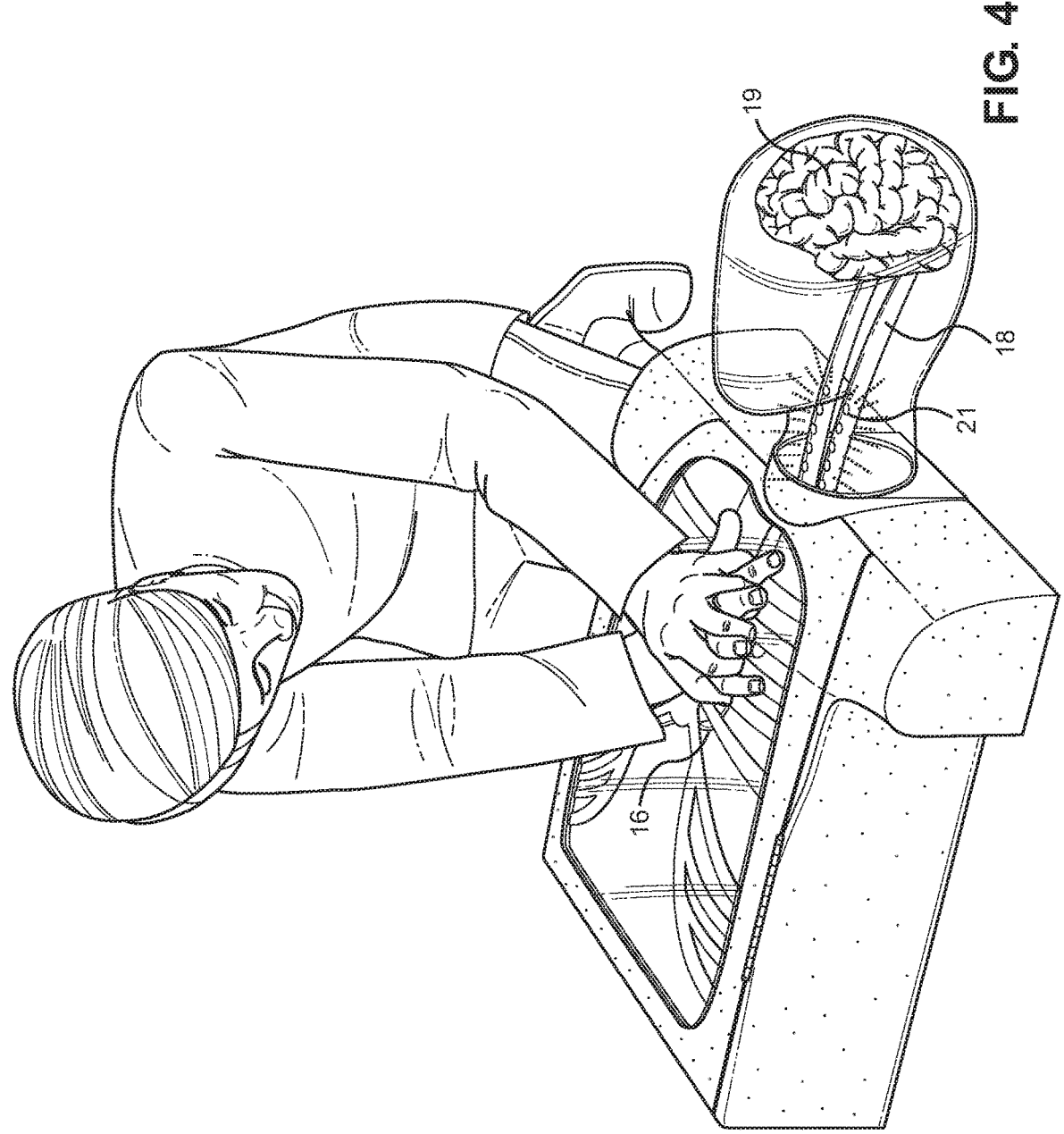
FIG. 4 shows a perspective view of one embodiment of the present invention having a chest compression being performed thereon.
Figure 5:
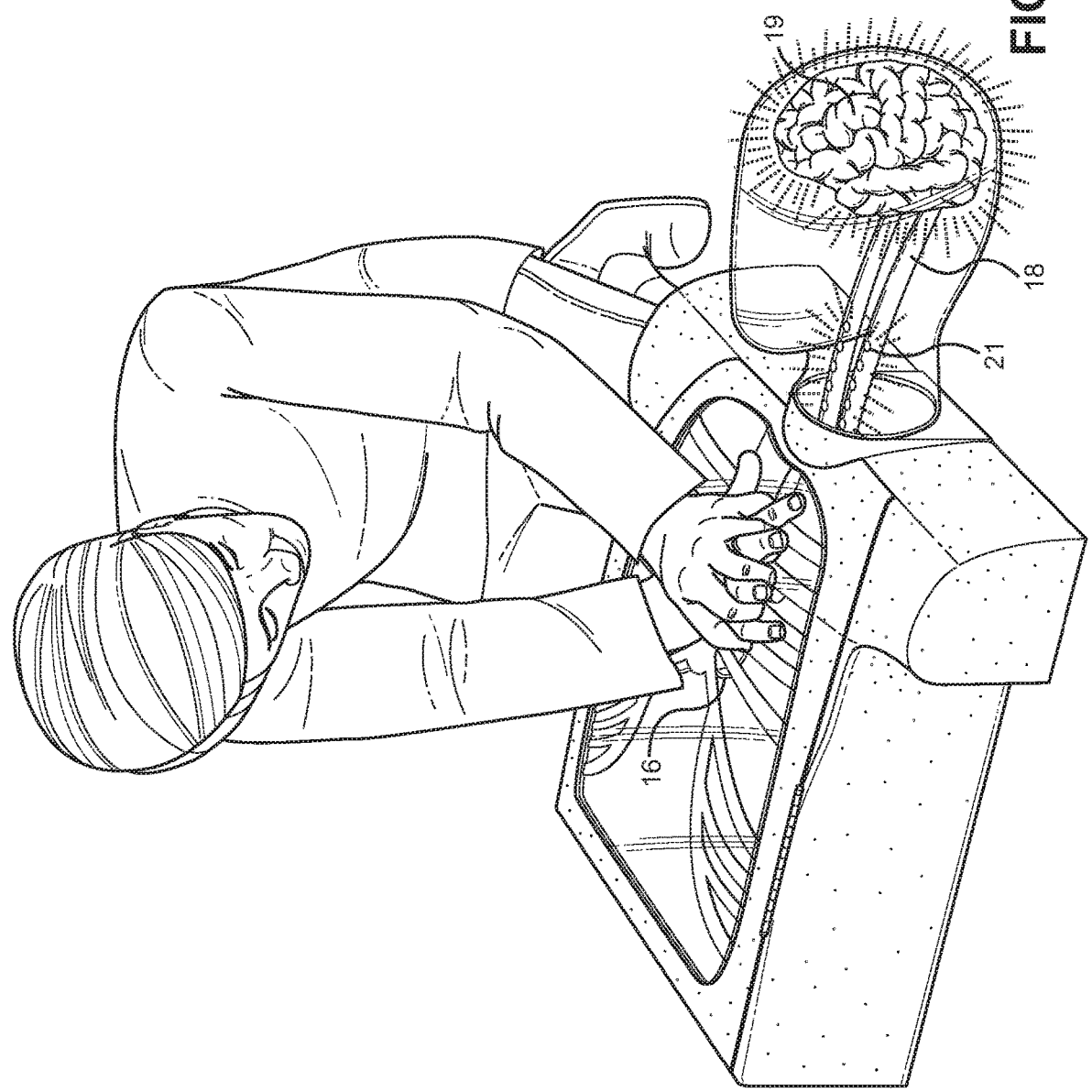
FIG. 5 shows another perspective view of one embodiment of the present invention having a chest compression being performed thereon.

Referring now to FIGS. 4 and 5, there are shown perspective views of one embodiment of the present invention having a chest compression being performed thereon. In the shown embodiments, the sensor 17 detects pressure of the chest compression being performed thereon. The carotid artery 18 further includes a plurality of lights 21 at intervals, wherein the plurality of lights 21 are configured to illuminate in response to the sensor detecting pressure. In the shown embodiment, the plurality of lights 21 face the user performing the chest compressions, however in alternative embodiments, the plurality of lights 21 may be in any arrangement.

In one embodiment, the plurality of lights 21 of the simulated carotid artery 18 illuminates in an ascending sequence from the heart 16 towards the brain 19. Specifically referring to FIG. 4, the sensor is detecting a first pressure. The first pressure is a pressure falling within a certain predetermined range, wherein the first pressure causes the plurality of lights 21 of the simulated carotid artery 18 to partially illuminate. An exemplary range of the first pressure is between more than 0 mmHg and less than 60 mmHg. In the shown FIG. 4, the first pressure is insufficient to cause the entirety of the plurality of lights 21 of the simulated carotid artery 18 to illuminate. Thus, the present invention indicates that the user is performing improper CPR chest compressions.

Specifically referring to FIG. 5, the sensor is detecting a second pressure. The second pressure is a pressure falling within a certain predetermined range, wherein the second pressure causes the plurality of lights of the simulated carotid artery 18 to fully illuminate and causes a light assembly of the brain to illuminate. An exemplary range of the second pressure is an amount equal to or greater than 60 mmHg. In one embodiment, the second pressure may include the first pressure, and also include other pressure amounts. In the shown FIG. 5, the second pressure is sufficient to illuminate the plurality of lights 21 of the simulated carotid artery 18 and to illuminate the light assembly 25 of the brain 19. In an alternative embodiment, the sensor 17 may be configured to detect a third pressure, wherein the third pressure is a pressure that too great that may be harmful to the patient.

Figure 6:
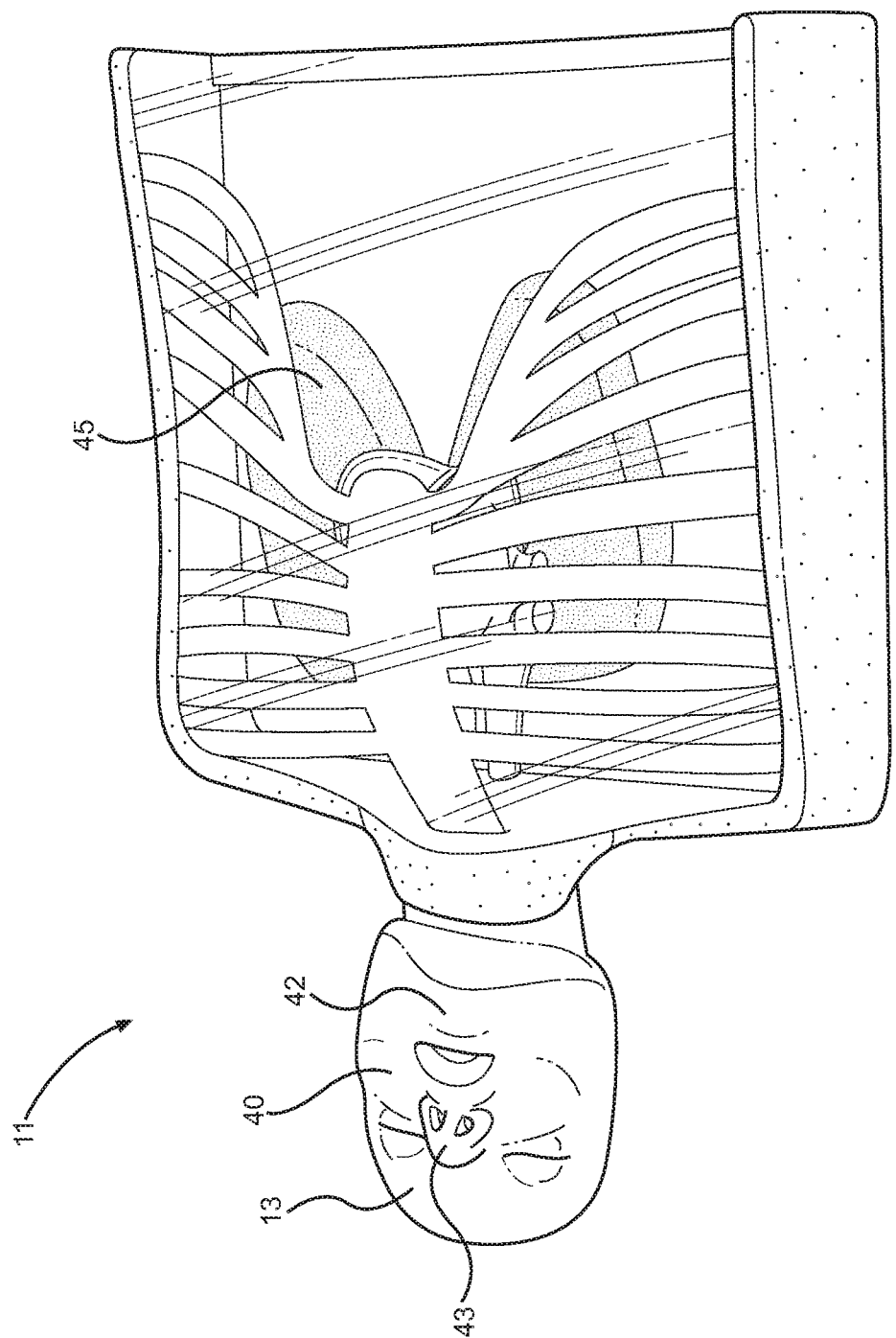
FIG. 6 shows a perspective view of one embodiment of the simulated respiratory system of the present invention.
Figure 7:
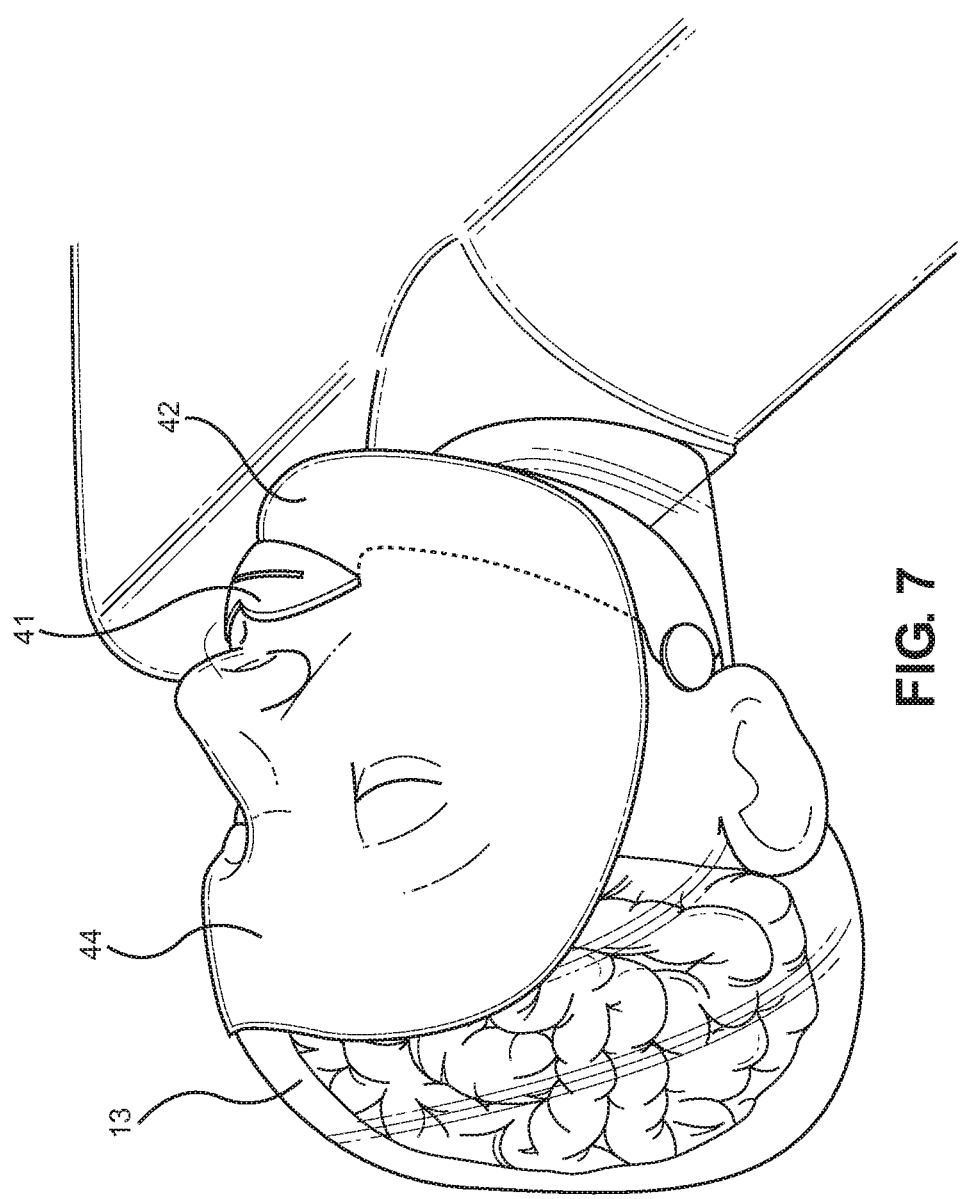
FIG. 7 shows a close-up view of view of the one embodiment of the simulated head of the present invention.

Referring now to FIGS. 6 and 7, there is a shown perspective view of one embodiment of the simulated respiratory system of the present invention, and a close up view of the one embodiment of the simulated head of the present invention, respectfully. In the shown embodiments, the patient training mannequin 11 further comprises a simulated lung 45 having a light source, wherein the lung 45 is configured to illuminate to indicate when a user performs a proper jaw-thrust maneuver. In a preferred embodiment, the head section 13 of the patient training mannequin 11 further comprises a simulated face 40 having a mouth, a nose 43, and a movable lower jaw 42. In the illustrated embodiment, the lower jaw is pivotally and movably secured to the remaining head section 13 such that the lower jaw is adapted to move independently therefrom. The lower jaw 42 is configured to mimic the movement of a person, allowing a user to perform a jaw-thrust maneuver on the simulated jaw. The lower jaw 42 includes a resting position and a thrusted position. In the resting position, the lower jaw 42 is positioned such that the mouth is substantially closed. In the thrusted position, the lower jaw 42 is positioned outward, away from the remaining head section 13, such that the mouth is open.

In the illustrated embodiment, the lower jaw 42 is operably connected to the lungs 45, wherein the light source of the lung 45 is configured to illuminate when the lower jaw 42 is in a thrusted position to indicate a user has performed a proper jaw-thrust maneuver. In the illustrated embodiment, the lungs 45 are configured to detect the thrusted position via a sensor, such as a flex sensor, a proximity sensor, motion sensor, and the like. In another embodiment, the simulated nose 43 is operably connected to the lungs 45, wherein pinching thereof causes the lungs to illuminate. The lungs may also be configured to illuminate if both the nose 43 is pinched and a jaw-thrust maneuver is performed on the jaw 42 simultaneously.

In some embodiments, the patient training mannequin 11 comprises an airflow sensor configured to detect the airflow received through the mouth of the simulated face 40. In the illustrated embodiment, the airflow sensor is disposed in the head section 13. However, in alternate embodiments, the airflow sensor is disposed in any suitable position within the patient training mannequin 11 configured to measure airflow received through the mouth. The airflow sensor detects a threshold airflow, the threshold airflow defined as adequate airflow to receive. Once the threshold airflow is detected, the light source of the lung 45 is configured to illuminate.

Further, a face cover 44 may be placed over the simulated head section 13 and a mouth plug 41 may also be inserted into the mouth. The face cover is configured to shield the mouth and the nose of the head section 13. For example, the face cover and mouth plug 41 assist with the teaching of bystander CPR.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A patient training manikin, comprising:
    a housing comprising a simulated head section connected to a simulated torso section, the simulated torso section including a simulated heart;
    a sensor configured to detect pressure, the sensor being in communication with a simulated carotid artery;
    the simulated carotid artery comprises a first end connected to the simulated heart;
    the simulated carotid artery having a plurality of lights, the plurality of lights configured to illuminate in response to the sensor detecting a first pressure.

2. The patient training manikin of claim 1, further comprising a simulated brain connected to a second end of the simulated carotid artery, the brain comprising a light assembly configured to illuminate in response to the sensor detecting a second pressure.

3. The patient training manikin of claim 2, wherein:
    the second pressure is an amount equal to or greater than 60 mmHg.

4. The patient training manikin of claim 1, wherein:
    the first pressure falling within a range between more than 0 mmHg and less than 60 mmHg.

5. The patient training manikin of claim 1, wherein:
    the housing comprises transparent section configured to allow a user to visually inspect, the simulated heart, the simulated carotid artery, and the simulated brain.

6. The patient training manikin of claim 1, wherein:
    the simulated carotid artery comprises a pair of elongated parallel tubes.

7. The patient training manikin of claim 1, wherein:
    wherein the simulated torso section is compressible a distance of two inches to simulate a response to CPR chest compressions.

8. The patient training manikin of claim 1, wherein:
    the plurality of lights of the simulated carotid artery illuminates in an ascending sequence from the simulated heart towards the simulated head section.

9. The patient training manikin of claim 1, wherein:
    the simulated torso section comprises an upper shell pivotally affixed to a lower shell via a hinge.

10. The patient training manikin of claim 1, wherein:
    the simulated heart is configured to be removed from the simulated torso section.

11. The patient training manikin of claim 1, further comprising:
    a simulated respiratory system having a simulated lung disposed within the simulated torso section, the simulated lung being operably connected to a simulated face disposed on the simulated head section, the simulated face having a simulated mouth, a simulated nose, and a simulated jaw, the simulated jaw being configured to move to simulate a jaw-thrust maneuver.

12. The patient training manikin of claim 11, further comprising:
    a face cover that is configured to shield the simulated mouth and the simulated nose of the simulated head section.

13. The patient training manikin of claim 11, wherein:
    the simulated lung having a light source, the simulated lung light source being configured to illuminate to indicate the proper jaw-thrust maneuver.

14. The patient training manikin of claim 1, wherein the sensor is configured to detect a third pressure, wherein the third pressure is more than a threshold pressure.

15. The patient training manikin of claim 1, wherein an interior volume of the housing is void of additional simulated organs.

16. The patient training manikin of claim 1, further comprising a skeletal support structure disposed within the simulated torso section.

17. A patient training manikin, comprising:
    a housing comprising a simulated torso section and a sensor, the sensor configured to detect pressure, the sensor being in communication with a simulated carotid artery;
    the simulated carotid artery having a plurality of lights, the plurality of lights configured to illuminate in response to the sensor detecting a first pressure;
    the plurality of lights of the simulated carotid artery illuminates in an ascending sequence from a lower end of the simulated carotid artery to an upper end of the simulated carotid artery.

* * * * *